3,147,067
METHOD OF REDUCING WATER EVAPORATION LOSSES IN OPEN RESERVOIRS
Ival O. Salyer, Dayton, Ohio, assignor to Monsanto Company, a corporation of Delaware
No Drawing. Filed Dec. 5, 1960, Ser. No. 73,502
4 Claims. (Cl. 21—60.5)

The primary object of this invention is to reduce water evaporation in reservoirs and other storage facilities in a low cost, efficient, easily practiced manner.

A further object of this invention is to provide a method for reducing the water loss by evaporation which does not require use of chemical treating agents.

A still further object of this invention is to provide a process for reducing evaporative loss in reservoirs, ponds, pools, and other areas where water is stored whereby the said reduction in evaporation can be accomplished at minimum cost under conditions of minimum expenditure of time for maintenance of the evaporation reducing system.

A still further object of this invention is to enable large savings in the cost of water retention in reservoirs by the application to the surfaces of the water a covering of substantially non-porous, three dimensional, solid pellets of a plastic material having a specific gravity of less than 1.0.

An ancillary feature of the instant invention is to secure low cost water retention in reservoirs by application to the water surface of a plastic material which has been provided with heat reflecting pigment.

A further object of the invention is to reduce the evaporation losses in open reservoirs by the employment of non-porous, three dimensional solid pellets which are distributed on the water surface.

The term "three-dimensional" as used herein is intended to denote particles having a substantial thickness dimension, e.g. from about 30 to 300 mils or more in the smallest dimension. Thus spheres, cylinders, cubes, semispheres, platelets (roughly circular in cross-section), teardrop shaped particles and particles which are roughly triangular in cross-section are exemplary of the three-dimensional shape as stated herein. In sharp contrast to these "three-dimensional" particles (viz. those having a substantial thickness in relation to the other dimensions) are particles or pieces having an extremely thin thickness dimension, e.g. films which have a thickness of about 0.5 to 10 mils and these are considered as "two dimensional" for all practical purposes. The present invention is concerned with the use of "three dimensional" particles.

The loss of water by evaporation from open reservoirs is a serious problem throughout the world. This problem exists in certain parts of the United States which suffer from water shortages, especially those sections where the water supply is acutely short. In the United States alone over 400 million dollars worth of water is being lost annually because of evaporation from open reservoirs. This problem is especially acute since the evaporation takes place after the costs of transporting, pumping, preliminary filtering, and preliminary chemical treatment have already been effected in carrying the water from the natural source to the reservoir (water storage facility).

Certain coating methods whereby the evaporative loss of water is diminished are already known. To a large extent these methods deal with the addition of chemical treating agents to the water in an effort to depress evaporation of water from the top surface of the reservoir. The cost of this water treatment is indeed high, and the initial cost disadvantage is compounded by the fact that this treatment must be repeated in a thoroughly continuous sequence in order to retain the advantage of reduction in evaporation. In an effort to reduce cost of the chemicals used in this treatment, the application of oil films has been tried. This method is unacceptable because of the contamination of the water introduced by application of oil films. The use of hydrocarbon compounds containing long hydrocarbon chains and a polar hydrophilic group, e.g., alcohols or acids has been attempted. These methods, although meeting with moderate success, are objectionable since the chemical treating agents must be continuously added to regenerate the effect of the anti-evaporation process. This constant regeneration is required because the material seems to disappear in large amounts, due to such probable causes as decomposition, dilution, evaporation, etc.

The ideal reservoir covering would be one which prevents the transmission of water vapor while at the same time permits the transmission of oxygen and carbon dioxide gases. It should be understood, however, that where the reservoir contains mainly industrial waste water, the necessity that the reservoir covering plastic material allow the escape of carbon dioxide and oxygen gases no longer prevails, as there is generally no requirement with industrial waste water that oxygen and carbon dioxide be allowed undisturbed entrance to or exit from the stored waste water. In cases where the water is to be used for drinking, the covering material must not be toxic, nor cause the formation of toxic materials in the water under practical conditions of use. Also in such a situation, it is desirable that the material not interfere with the normal biological environment present in the water. The material and its application should be inexpensive enough so that the cost of its use and maintenance is economically attractive as compared with the expense of procuring additional water to replace that lost by unopposed evaporation. This economic factor would not be as stringent in cases where the shortage of water is a serious one, especially in areas where the weather environment is essentially an arid one, since under those conditions the demand for water invariably exceeds the supply, and it would be cheaper to spend a slight additional amount in cost to retain the water already procured from distant sources than to acquire a new supply thereof. In such a situation higher costs are justified.

The present invention offers an effective solution to the problem of evaporation of water, and provides the closest approach to an ideal reservoir covering. According to the present invention the surface of the water is substantially covered with three dimensional pellets of organic plastic. These pellets float on the surface of the water and therefore in general should have a specific gravity of less than 1.0. Of course in the solution to the problem as proposed by the instant invention, the added advantages of low cost, low maintenance, non-toxicity, and absence of deleterious effect on fish and plankton (as well as natural bacteria and other biological life present within the stored water) offer an extremely desirable solution to the problem of water evaporation losses. These advantages, especially insofar as the biological environment of the body of water is concerned, are quite important since even a slight unbalance in said environment might well result in ultimate water quality impairment.

Any inert plastic material can be employed in the practice of this invention as long as it; (1) has a specific gravity low enough to enable it to float on water; (2) is insoluble in water. The pellets of the plastic must possess a solid or non-porous structure and a 3 dimensional shape. The plastic being inert, does not react with the water causing either the decomposition of the plastic or the production of obnoxious or toxic by-products. Generally, of course, the specific gravity of the plastic chosen will be less than 1.0; but in certain circumstances (e.g., where the water density due to individual environmental constitution thereof is higher than 1.0) the use of plastic with a specific gravity of 1.0 or slightly higher may be tolerated. Water with an appreciable amount of dissolved or dispersed minerals or mineral salts contained therein might allow use of a plastic of a specific gravity of 1.0 or slightly higher.

Polyethylene and polypropylene prepared by either high pressure or low pressure polymerization and having densities from 0.84 to about 0.98 can be used. Vulcanized or unvulcanized rubber polymers having densities less than 1.0 may also be used in the practice of my invention. Polybutadiene; butadiene/styrene copolymers; butadiene/acrylonitrile copolymers; butyl rubbers; and ethylene/propylene copolymer rubbers may all be used to advantage. When heavy comonomers such as styrene or acrylonitrile are present in the composition, the amount of such comonomer must be regulated so that the density of the product is less than 1.0, and preferably about 0.9. However, because of their low initial cost, and ease of converting to the desired three dimensional form, rigid thermoplastics such as polyethylene, polypropylene, and copolymers of ethylene or propylene with minor amounts of other copolymerizable monomers are especially well suited and desirable for the practice of this invention. These 3-dimensional pellets can be readily formed in a variety of shapes by a combined extrusion and cutting operation. Polyethylene and polypropylene in general have the desirable properties of transmitting oxygen and carbon dioxide but not allowing substantial transmission of water vapor. A large number of polymers of ethylene, including both homopolymers of ethylene and ethylene copolymers can be employed. Accordingly the term "ethylene polymer" as used herein and in the claims is intended to include the products obtainable by polymerizing ethylene alone or with other polymerizable materials, especially those having ethylenic unsaturation.

In addition to the homopolymers of ethylene and propylene, ethylene and propylene copolymers can be employed in the form of non-porous, 3-dimensional, solid pellets according to the instant invention. While a great latitude in the selection of polymers and copolymers having the desired properties (especially a specific gravity of less than 1.0) exists, the following are listed as exemplary copolymers: ethylene-vinylacetate; ethylene-methylacrylate; ethylene-acrylic acid copolymer; ethylene-methacrylic acid copolymer; ethylene-methylmethacrylate; ethylene-vinylidene chloride; ethylene-vinyl chloride; ethylene-vinylidene fluoride; ethylene-vinyl fluoride; ethylene-vinyloxyethanol; ethylene-vinylidenechloridefluoride; ethylene-acrylonitrile; ethylene-propylene; ethylene-butylene; etc. The comonomers listed in conjunction with ethylene can be copolymerized with propylene also and of course propylene-ethylene copolymer can be used. The plastic materials employed herein can be homopolymers of ethylene with other comonomers which possess mono-alpha olefinic unsaturation, such as the copolymers listed above. In fact any polymer of hydrocarbon monoolefinically unsaturated monomers of from 2 to 10 or more carbon atoms can be employed, e.g., homopolymers and copolymers of ethylene, propylene, 1-butene, 1-hexene, 1-octene, etc. These monoolefinically unsaturated hydrocarbon monomers can be copolymerized with one another, or with other comonomers such as those enumerated above in conjunction with the ethylene copolymer. The overriding consideration in selection of the polymer is that it should have a specific gravity of less than 1.0. Any inert polymer can be used as long as it has a specific gravity less than 1.0, and is water-insoluble. The preferable percent of comonomer should not exceed 10%, but nylidene fluoride; ethylene-vinyl fluoride; ethylene-vinyl long as the specific gravity of the copolymer is less than 1.0.

Various ultra-violet absorbents and stabilizers may be added to the above-mentioned homopolymers and copolymers to improve their ageing properties. As exemplary of suitable U.V. absorbents the following can be named: 2,4 - dibenzoylresorcinol; 2,4 - dihydroxybenzophenone; 2-hydroxy-4-methoxybenzophenone, etc.

An improvement in reflectance of the non-porous, 3-dimensional, solid, plastic pellets, as contemplated by the present invention can be achieved by providing said pellets with surface reflecting properties. This can be accomplished for example by incorporating into the polymer small "pigment-sized" particles of heat reflecting inorganic metallic oxide materials. As exemplary of such particles, titanium dioxide, zinc oxide, zinc sulfide, calcium carbonate, barium sulfate, etc. can be named. These particles can be blended with the plastic material in the ratio of approximately 0.5 to 5.0 grams of heat reflecting particulate pigment per pound of polymer. Higher concentrations of heat reflective metal oxide pigment can be employed, the only limitations being that the non-porous, 3-dimensional, solid pellets of plastic material which contain the reflective pigment blended therein should possess a specific gravity of less than 1.0, and that reasonable cost considerations be observed.

Another method of securing heat reflecting surfaces on the non-porous, 3-dimensional, solid pellets of plastic material is by metallizing the outer surfaces thereof especially the surface(s) floating on or above the water surface, with a very thin film of a heat reflecting metal. The above-mentioned plastic pellets can be provided with such metallized surfaces by thermal evaporation in vacuo, cathodic sputtering, dipping, screening, and any of the metallizing processes which impart extremely thin films of metal to the coated base. Although the cost of employing these metallized plastic pellets slightly exceeds the cost of the solid plastic pellets without such reflecting surfaces, the increase in reflectance, and the accompanying increase in efficiency of the evaporation reducing system makes the use of metallized film worthwhile in certain cases.

Various other pigments, including colored organic and inorganic pigments (esp. red pigments), can be used as long as they reflect in the infrared range so as to reflect heat waves. An attendant benefit of pigmentation with colored pigments is that they tend to render the pellets opaque to ultraviolet rays and lengthen the useful life of the polymer material by increasing its ageing properties. The organic pigments if used are usually employed in much lower concentrations than the inorganic pigments. A concentration of about .001 to 0.1 gram of organic pigment per pound of polymer is generally observed. The presence of colored pigments distributed within the plastic pellets creates decorative effects, and serves to beautify the reservoir or other water storage facility. Thus both the functional (evaporation-reduction) and aesthetic (enhancement in physical appearance) objectives of the reservoir can be furthered by the same covering with but a minor increase in expenditure for the cost of coloring materials. This is not to state, however, that the non-porous, 3-dimensional, solid plastic pellets will not function effectively in reducing evaporation when there is no metal oxide pigment or organic pigment or metallized reflective surface applied thereto. The addition of pigments or reflective surfaces merely serves to increase the advantages secured by the use of the 3-dimensional pellets.

The actual mechanism of the reduction of evaporation by use of the non-porous, 3-dimensional, solid plastic pellets is not completely understood. It is clear that the absorption of solar radiation by the water is one of the main driving forces for evaporation. Apparently the major effect of the solid plastic pellets of this invention is the reduction of the rate of diffusion of water molecules from the water surface into the air as perhaps by a mechanical blocking wherein the pellets form a barrier thus preventing the water molecules from evaporating. However, the effectiveness of the solid plastic pellets may also be due to the relatively poor heat absorption characteristics of the plastic covering as it exits floating on the water surface. The reflection of solar energy back away from the water surface could also play an important role in preventing evaporation in the process of this invention. In any event the invention disclosed herein is not to be considered as limited by, or depending for its operation upon these or any other theories.

The non-porous, 3-dimensional, solid plastic polymer pellets according to the present invention can be employed in various shapes and sizes. The shape of the solid plastic pellets should be such, however, that the pellets themselves do not tend to "pile-up" upon one another. For this reason pellets in the form of spheres are especially suitable since the surface covering will restore itself readily to a homogeneously distributed layer after being disturbed by the influence of wind and having action within the body of water itself. Other shapes can be employed, such as platelet-shaped solid polymer pellets (circular in cross-section with a diameter slightly greater than the cross sectional width); cube-shaped pellets; solid pellets having a rectangular shape wherein the thickness is less than the width dimension; cylindrically shaped pellets wherein the height of the cylinder (cross-sectional width) is greater than or equal to the diameter thereof; semi-spherical shaped pellets; "teardrop" shaped pellets; pyramid-shaped pellets; pentagonal pellets having a cross-sectional shape which is triangular; cone-shaped pellets; and other solid polygons of various shapes; etc. The reservoir covering can be formed from a mixture of shapes and sizes of pellets. The thickness of non-porous, 3-dimensional, solid organic polymer pellets can be varied to suit the particular environmental conditions. The situations of use are subject to many variables, such as wind velocity, waving action, varying intensities of solar radiation, etc. Thus in an area where the waving action and wind are severe pellets of larger size and thickness can be employed. In areas where the intensity of solar radiation is the prevailing factor, solid pellets having a larger surface area and a lesser thickness would be employed. The non-porous, 3-dimensional, solid plastic pellets, irregardless of shape, should have a minimum thickness of about $1/16$ inch. Alternatively stated the smallest dimension should be at least $1/16$ inch. Pellets having a minimum thickness of $3/16$ to 1 inch or even higher can conveniently be employed in the practice of the present invention, the essential requirement of the method disclosed herein being that the solid pellets of plastic form a covering over the water surface. The number, size, and thickness of the solid, non-porous, 3-dimensional pellets which are required in order to substantially cover the surface of the water storage facility will vary somewhat according to the intensity of wind velocity and subsequent waving action presented at the surface of the water. Mixtures of various sizes and shapes of pellets can be used in the same reservoir covering (e.g., a mixture of larger and smaller diameter spheres). It is important, however, that the said pellets substantially cover the surface of the water. In arid regions where the wind velocity is extremely high, the use of solid plastic pellets of relatively large dimension and size may be justified on a cost basis. In view of the fact that the annual evaporation losses of water for the United States as a whole are an estimated 20 million acre-feet per year, and in the eleven western states (not including Texas or Oklahoma), evaporation loss of water constituted approximately 11 million acre-feet per year; the method of the present invention offers an efficient, low cost way of increasing water conservation. When compared with the cost of the saline water demonstration plants which give promise of water at a cost of 155 to 330 dollars per acre-foot (.50 to 1.00 dollar per 1,000 gallons), the economic value of the instant invention becomes obvious. As previously stated the size, thickness, and number of the plastic pellets employed to provide the aforementioned substantial covering upon the surface of the body of liquid will vary according to the environmental conditions found at the specific water storage facility. Thus the invention disclosed herein and the application thereof is subject to wide variation. The plastic pellets can be distributed upon the water surface in any convenient fashion such as dumping at selected locations, scattering, or overhead distribution as by an airplane or helicopter. The particular manner of attaining homogeneous distribution of the pellets is relatively unimportant. An area-wise covering concentration of at least 50 percent is recommended but, of course, any area covering will assist in reducing evaporation. A covering of 75 to 85 percent or even higher is especially well suited to reduce water evaporation in the method according to the instant invention.

The term "non-porous" as used herein is intended to denote the absence of a significant foamed structure in the solid plastic pellets. Also to be avoided is the presence of a significant volume of gas or free space located in general within the plastic pellet. Such materials as foamed polymer pellets and polymer pellets having a central area or areas of trapped gases located internally therein are less suitable since inevitably the water upon which they are placed will seep into said spaces and reduce the efficiency of the reservoir covering. Moreover pores in such pellets or particles tend to act as capillaries through which the sub-surface water can gain access to the upper surface and hence indirectly aid evaporation. Another disadvantage of employing pellets having gaseous materials included therein lies in the fact that the waving action and severe wind present in many open water storage areas causes these porous materials to be repeatedly thrust upon one another eventually resulting in rupture of the cells and consequent damage to the evaporative reducing covering upon the water surface. As previously mentioned one of the advantages of the instant invention is that it demonstrates extremely low maintenance cost, and practically no additional distribution of polymer pellets is required even under severe environmental conditions. However in the case of plastic foamed materials and other polymer particles possessing gaseous voids many problems exist in re-supply of the porous materials to repair the covering. Another disadvantage of employing porous materials resides in the fact that they may be so light (of such low specific gravity) that they become airborne and are actually cast upon the shore by severe wind action thus leaving substantial area voids in the reservoir covering and creating troublesome deposits upon the shore.

The body of water with the top surface substantially covered by solid, 3-dimensional, non-porous pellets of an organic plastic polymer having a specific gravity of less than 1.0 is one which is resistant to water losses due to evaporation and is likewise within the purview of the instant invention.

The invention will be further illustrated by the following examples.

*Example 1*

Cylindrically shaped pellets of "Marlex 5000" (Phillips Petroleum Co.'s low pressure polyethylene polymer containing a minor amount of butene-1 comonomer) having a specific gravity of about 0.95 before pigmentation and having a small amount of titanium dioxide pigment incorporated therein, on a weight basis of 5.0 grams of $TiO_2$ per pound of "Marlex 5000," were distributed upon the upper surface of the water contained in a reservoir roughly circular in shape and having a diameter of about 3 feet. The reservoir was initially filled to a depth of approximately 3¾ inches of water. The cylindrically shaped pellets were added to the water until a substantial covering of the top surface of the water was observed visually. This covering operation took about 1280 grams of the $TiO_2$-pigmented cylindrically shaped pellets. Each pellet had a diameter of about $3/16$ of an inch and a heighth slightly in excess of the diameter. A similar reservoir, also 3 feet in diameter, was filled to a depth of 4¼ inches but no pellets were added thereto, and this reservoir served as a control. Both reservoirs were placed outdoors in the open, and subjected to atmospheric conditions of sunlight and wind. About 3 weeks later (22 days after initial subjection to atmospheric conditions) both the control and polyethylene-covered reservoirs contained water. The control required the addition of 26 liters of water to restore the water to the original depth of 4¼ inches. The reservoir with the titanium dioxide pigmented polyethylene cylinders required only 7 liters to restore it to its original depth (3¾ inches). This constitutes over a 300 percent reduction in evaporation loss as compared to the "un-covered" control.

*Example 2*

The procedure was conducted as described in Example 1 with the exception that 995 grams of spherical pellets of "Vestolen" (low pressure polyethylene having a specific gravity of about 0.94) were spread over the water surface so as to substantially cover the surface of the three foot diameter circular reservoir. This reservoir was filled with water to a depth of about 3¾ inches. After 22 days it required 15 liters to restore the water depth to its original reading. As compared with the control, which required 26 liters of water, this water reservoir covering achieved a reduction of evaporation of over 70 percent.

*Example 3*

Cubes of Monsanto polyethylene "grade 9352" (high pressure polyethylene having a specific gravity of about 0.92), having a thickness dimension of about 3/16 of a inch on edge, were added to the surface of the water contained in the 3 foot diameter reservoir filled to a depth of 4 inches. 1114 grams of the polyethylene cubes were required to substantially cover the water surface. About 3 weeks later 16 liters of water were required to restore the reservoir to its original water depth. As compared with the control, which required 26 liters, this reservoir covering effected a reduction in evaporation of about 70 percent.

*Example 4*

Polypropylene platelets having a specific gravity of about 0.90, a diameter of about 3/16 inch, and a thickness of about 1/16 inch were applied to the surface of the water contained in a reservoir having a diameter of about 3 feet and a water depth of about 3⅞ inches. Approximately 826 grams of polypropylene platelets were required to substantially cover the surface of the water. About 3 weeks later this reservoir required 18 liters to restore the water contained therein to its original depth. This reservoir covering attained a reduction in evaporation of over 30 percent, thus conserving 30 percent of the water which would otherwise be evaporated into the atmosphere.

I claim:

1. The method of reducing evaporative losses of water in open reservoirs which comprises substantially covering the surface of the water with non-porous, 3-dimensional, solid pellets of a thermally stable, non-toxic, water insoluble, substantially water impervious, plastic organic polymer which has a specific gravity of less than 1.0, said pellets having heat reflecting pigment particles embedded therein, having a minimum dimension of at least about 1/16 inch, and being characterized by an absence of gaseous voids.

2. The method of claim 1 wherein the organic plastic polymer is polyethylene.

3. The method of claim 1 wherein said particles are particles of titanium dioxide.

4. The method of claim 1 in which the plastic organic polymer is an ethylene polymer selected from the group consisting of: homopolymers of ethylene and copolymers of ethylene, and wherein the said ethylene polymer has a specific gravity of less than 1.0.

References Cited in the file of this patent

FOREIGN PATENTS 13,780/28     Australia _____ June 11, 1928

OTHER REFERENCES

Chemical Eng., vol. 64, No. 9, p. 180, September 1957.

UNITED STATES PATENT OFFICE
CERTIFICATE OF CORRECTION

Patent No. 3,147,067                  September 1, 1964

Ival O. Salyer

It is hereby certified that error appears in the above numbered patent requiring correction and that the said Letters Patent should read as corrected below.

Column 3, line 71, after "but" insert -- the polymer can contain any amount of comonomer as --; line 72, strike out "nylidene fluoride; ethylene-vinyl fluoride; ethylene-vinyl-".

Signed and sealed this 8th day of December 1964.

SEAL)
Attest:

ERNEST W. SWIDER                  EDWARD J. BRENNER
Attesting Officer                    Commissioner of Patents